Feb. 6, 1962  J. J. HOFMANN ET AL  3,020,376
LAMINATED PLASTIC ARTICLES AND METHOD OF MAKING THE SAME
Filed Dec. 31, 1956  2 Sheets-Sheet 2

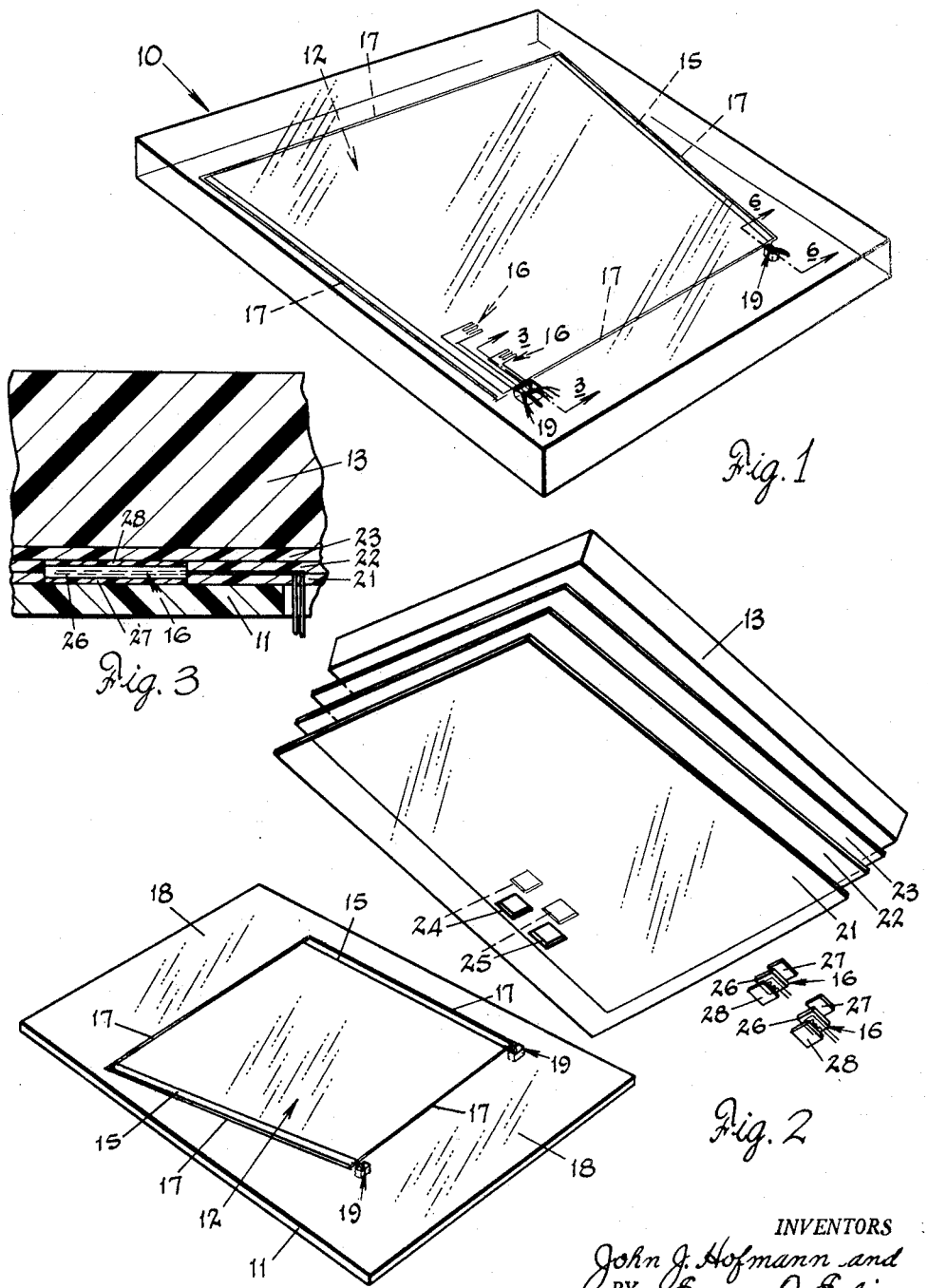

INVENTORS
John J. Hofmann and
BY Eugene D. Esling
Nobbe & Swope
ATTORNEYS 3,020,376
Patented Feb. 6, 1962

3,020,376
LAMINATED PLASTIC ARTICLES AND METHOD OF MAKING THE SAME
John J. Hofmann and Eugene D. Esling, Toledo, Ohio, assignors to Libbey-Owens-Ford Glass Company, Toledo, Ohio, a corporation of Ohio
Filed Dec. 31, 1956, Ser. No. 631,584
9 Claims. (Cl. 219—19)

This invention relates broadly to electrically conductive articles, and more particularly to laminated electrically conductive plastic articles and to a method of preparing such articles.

Recently, electrically conducting transparent articles have found wide use where it is necessary that vision through windows be kept free of ice and fog formations. This is particularly true in aircraft in which the windows are frequently subjected to various and extreme weather conditions. Prior to this invention, it was customary to provide aircraft with electrically conducting glass sheets for this purpose, and while glass sheets have proved entirely satisfactory, plastic windows or glazing closures have certain advantages and are also used for aircraft windows.

The advantage of the plastic resides primarily in the ability to shape the plastic to form various curvatures, and plastics have been used for bubbles and other such complex curved surfaces. However, prior to this invention, no one has provided a satisfactory transparent plastic panel suitable for aircraft which has an electrically conductive film that provides the removal of ice and fog formations by electrical energy.

It is also desirable in aircraft windows to provide a laminated plastic structure which is composed of two or more plastic sheets in order to give the required physical properties.

It is therefore a primary object of this invention to provide a novel laminated electrically conductive article and method of making the same.

Another object of the invention is to provide a novel method of laminating plastic sheets to form an electrically conductive article.

A further object of the invention is to provide a novel method of placing lead wires in contact with the electrodes of an electrically conductive film in a laminated article.

A still further object of the invention is to provide a method of treating the plastic sheets to be used in the laminated plastic structure such that they will have better physical properties.

A still further object of the invention is to provide an electrically conductive laminated article which may be shaped without the loss of electrical and physical properties.

Other objects and advantages of the invention will become more apparent during the course of the following description when taken in connection with the accompanying drawings.

In the drawings wherein like numerals are employed to designate like parts throughout the same:

FIG. 1 is a perspective view of a completed article made according to the invention;

FIG. 2 is an exploded perspective view of a series of the laminations which form a part of the completed article shown in FIG. 1;

FIG. 3 is a fragmentary sectional view of the assembled article prior to the lamination thereof taken substantially in a position represented by lines 3—3 of FIG. 1;

Figure 6:
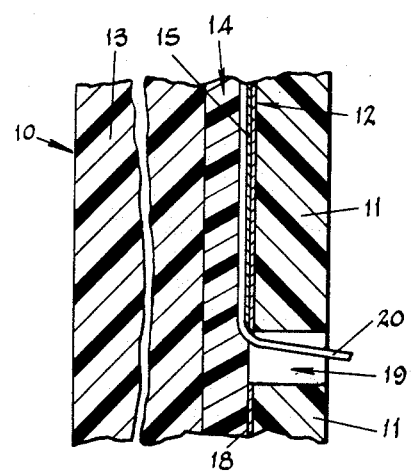
FIG. 6 is a fragmentary sectional view of the completed article taken substantially along lines 6—6 of FIG. 1.

With reference now to the drawings, there is shown in FIG. 1 an electrically conductive laminated article indicated generally by the numeral 10. As shown in FIG. 6, the article 10 includes a plastic sheet 11 having an electrically conductive film 12 thereon and a sheet 13 laminated to the electrically conductive film and the sheet 11 by means of a plastic interlayer 14. Power is supplied to the film 12 by electrodes 15 placed in contact with the electrically conductive film 12 and connected to a suitable power source. Sensing elements 16 connected to a control circuit (not shown) are provided in the unit for controlling the temperature of the unit by regulating the amount of power supplied to the conductive film.

In fabricating the electrically conductive article 10, the electrically conductive film 12 is formed on the plastic sheet 11. This film may be, for example, of the type described in U.S. Patent No. 2,628,927, issued February 17, 1953, to W. H. Colbert et al., which comprises a metal film selected from the group consisting of gold, silver, copper, iron and nickel deposited by vacuum techniques. However, other electrically conductive films may also be used depending on the desired characteristics of the conductive layer and the material of the sheet 11.

A plastic material which has been found very satisfactory for use with the electrically conductive films of the above-noted U.S. Patent No. 2,628,927 is CR-39—a polyester (a diallyl diglycol carbonate polymer) made by the Cast Optics Company, Hackensack, New Jersey. Other materials that may be used are "Gafite," which is methyl-a-chloroacrylate polymer made by the General Aniline and Film Corporation, New York, New York; the acrylics such as "Plex II," "Plex 55" and "Polymer K" made by Rohm & Haas, Philadelphia, Pennsylvania; the polyesters such as "Sierracin" made by the Sierracin Corporation, Burbank, California; the polystyrenes; and others.

Figure 7:
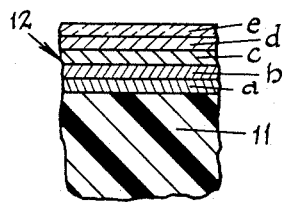
FIG. 7 is a fragmentary sectional view illustrating the various layers which comprise the electrically conductive film.
Figure 5:
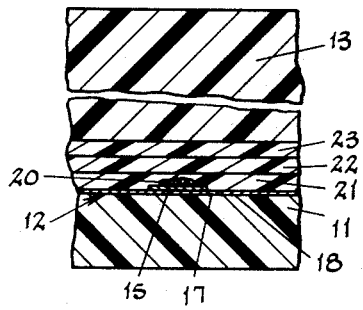
FIG. 5 is a fragmentary sectional view illustrating the relative position of the laminates of the completed unit prior to lamination into a composite unit.

As shown in detail in FIG. 7, the transparent electrically conductive film may comprise a sealer layer $a$ in contact with a surface of the plastic sheet 11; an adhesive layer $b$ preferably formed of a metallic oxide; a layer of electrically conductive metal $c$ such as gold, nickel, iron, silver and copper; as described in Patent 2,628,927; a second adhesive layer $d$ preferably formed of a metallic oxide and a protective layer $e$ such as quartz, aluminum oxide, magnesium fluoride and the like. These layers are all placed on the sheet while it is in a substantially flat condition for reasons to be described later.

More specifically, the sealer layer $a$ prevents plasticizer from coming out of the plastic and affecting the adhesive characteristics of the other layers during the filming process. For most purposes, it has been found that the sealer layer may be of quartz, titanium dioxide, aluminum oxide, chromium oxide or equivalent material and may be in the neighborhood of 1¼ molecules or approximately 7 to 10 Angstrom units in thickness or thicker if desired. However, while the sealer layer is desirable, in some cases, where the plasticizer does not readily come out of the plastic when the plastic is heated slightly, it may be dispensed with.

With reference now to the adhesive layer $b$, it is generally composed of metal oxide approximately ½ molecule or more in thickness which directly and permanently adheres by molecular forces to the quartz layer *a* and also acts by strong molecular force to hold the metal layer *c*. These adhesive metal oxides may be those of lead, silver, aluminum, magnesium, nickel, zinc, thorium, and other rare earth metallic oxides and the oxides of cadmium, antimony, bismuth, mercury, copper, gold, platinum, palladium and other heavy metal oxides, which when applied over glass or other siliceous surfaces, are highly adherent to such surfaces as well as to the metals such as gold, nickel, iron, silver and copper noted above in connection with layer *c*.

The metallic oxide adhesive layers or coatings *b* may be deposited on the sealer layer *a* by direct thermal evaporation or a metal first deposited on the quartz by thermal evaporation may be oxidized to form a metallic oxide. A further way in which the layers of metallic oxide may be produced is by first applying a thin coating by sputtering a metal in a residual vacuum which comprises in part oxygen such that the metal is combined with the oxygen remaining in the air to form an oxide when deposited on the layer *a*.

After the oxide adhesive layer *b* has been placed on the support body, the electrically conductive layer *c* is deposited over the adhesive layer. Preferably, the conductive layer is deposited by means of thermal evaporation so that an extremely uniform coating may be formed as slight variations in thickness will result in areas of variable electrical conductivity and thus hot spots or unevenly heated areas will develop along the thicker areas of the layer.

By using thermal evaporation methods to deposit the electrically conductive layer *c*, there is deposited one molecule upon the other in a manner to form a smooth surface over the adhesive layer *b*. The adhesive layer acts to strongly secure the metal conductive layer to the plastic sheet 11 through the sealer layer *a*. Moreover, the adhesive layer and the sealer layer reduce the possibility of a chemical reaction or intermingling taking place between the plastic of the sheet 11 and the metal of the conductive layer.

Over the conductive metal layer *c* there is placed a second adhesive layer *d* formed of a metallic oxide such as described above in connection with the adhesive layer *b* for the purpose of securing the protective layer *e* such as quartz over the conductive layer. The protective layer helps to protect the conductive layer *c* from mars or scratches prior to assembly which tend to break some of the electrical paths across the layer thereby causing current concentrations or localized heating to develop. When quartz or silica is used for the protective layer *e* it is also found that it acts as an adhesive layer for the plastic sheet which is to be laminated in contact with it, particularly when the plastic is polyvinyl butyral. Especially good results are obtained when the polyvinyl butyral sheet is plasticized with 37 parts dibutyl sebacate per 100 parts polyvinyl butyral by weight.

After the electrically conductive film 12 has been formed on the sheet 11, the electrodes or bus bars 15 are placed in contact with the film at spaced-apart points. These electrodes enable power to be brought to the film 12 and may be formed of silver particles suspended in a suitable vehicle or carrier as is well known in the art.

To bring power to the electrically conductive film, electrodes 15 are provided along a pair of opposed marginal edges of the film. These electrodes may be placed in contact with the conductive layer *c* before the adhesive layer *d* and protective layer *e* are placed over the conductive film *c* or, the adhesive layer and protective layer may be masked along the marginal edge areas or they may be removed so as to allow the electrodes to be placed in contact with the layer *c*. In some cases, if the layers *d* and *e* are relatively thin, the electrodes may be placed in contact with one or the other of the layers and current may be passed through the layer or layers from the electrodes to the conductive layer *c*.

It is also desirable to initially place the electrodes 15 on the article at a temperature above the normal temperature at which the plastic sheet 11 and the electrically conductive film 12 are to be heated when power is applied to the conductive layer so as to reduce the effect of the expansion of the heated plastic on the electrodes. In other words, when the plastic is heated it expands and if the electrodes are not placed on the article under conditions that corresponded to expansion conditions, later expansion of the plastic will cause the electrodes to crack thus breaking their electrical continuity.

When the electrodes are placed on the article at temperatures corresponding to operating temperatures, subsequent cooling of the article will cause the plastic to contract placing the electrodes in compression which will not affect their electrical continuity. Subsequent heating and expansion of the plastic will then only restore the electrodes to their initial state of stress and will not affect their continuity. Of course, it will be evident that the plastic may not be heated substantially above the deformation or distortion temperature and the exact temperature to which it is heated will depend upon the characteristics of the particular plastic used.

Figure 4:
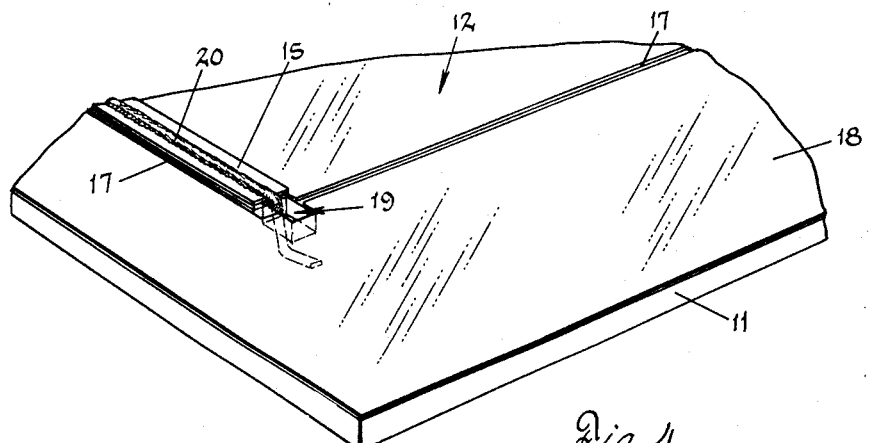
FIG. 4 is a fragmentary perspective view of a sheet of the laminate having the electrically conductive film and electrodes thereon.

To maintain the flow of current between the electrodes and along the definite pattern within which it is desired to heat the electrically conductive film, the area between the electrodes is isolated from film on the remainder of the sheet by removing the film along the areas as indicated at 17 in FIGS. 1, 2 and 4. The deleted areas thus sever the continuity of the conductive film and prevent stray currents from entering the end sections 18 of the filmed surface. The main reason for placing the electrically conductive film over the entire surface of the sheet 11 is to minimize optical distortion, since if the sheet is coated over its entire area, changes in optical characteristics will be kept at a minimum.

In order that electrical lead wires can be brought into contact with the electrodes 15, holes or openings 19 are provided in the sheet 11 preferably at an end of each of the respective electrodes. These openings can be formed in the sheet before the electrically conductive film 12 and electrodes 15 are applied or, after they are applied. However, these holes must be carefully edged to avoid crack propagation during handling and laminating.

It has been found generally undesirable to solder the lead wires directly to the electrodes as has been common practice in the past since the heat might tend to melt or distort the plastic. To alleviate this problem, according to one aspect of the invention, as shown in FIG. 4, lead wires 20 are laid generally along the entire length of the electrodes or bus bars 15 and extend through the openings 19 but are not soldered to the bus bars. For this purpose, it has been found that braided wire or cable is very satisfactory since it may be formed in flat or strip form thereby providing a relatively wide surface to contact the bus bars or electrodes. Preferably, braided copper wire which has been tinned or coated with solder is used for lead wires.

After the power leads 20 have been placed in contact with the electrodes 15, a first layer 21 of the interlayer 14 of polyvinyl butyral or similar material is placed over the surface of the electrically conductive film and in contact with the braided leads. The leads are then held in position with respect to this sheet by the application of localized heat to the sheet at several points above the electrodes. This serves to bond or tack the leads 20 to the laminating sheet and prevents them from becoming disarranged with respect to the electrodes and with respect to one another prior to laminating.

The interlayer 14 is generally made up of a plurality of relatively thin sheets of polyvinyl butyral plastic, and in the preferred embodiment three sheets 21, 22 and 23, each .025 inch thin are used. The sheets 21 and 22 have holes 24 and 25 cut out in them for placement of the sensing elements 16 as hereafter described. With the laminating sheet 21 in place over the leads 20, the laminating sheet 22 is placed thereof with its holes 24 and 25 in alignment with those in sheet 21. The sensing elements 16 are usually secured in a patch 26 of polyvinyl butyral which has an area corresponding to that of the holes 24 and 25. It is also desirable to use patches of plastic 27 and 28 in combination with the patch containing the sensing elements 16. First the patches 28 are placed in the holes 24 and 25, and these serve to separate the sensing elements from the electrically conducting film and provide both thermal and electrical insulation therefrom. The patches containing the sensing elements 16 are then placed in the holes, and then the patches 27 are placed over the sensing elements 16 to provide an upper surface flush with the upper surface of the laminating sheet 22. The lead wires for the sensing elements are drawn over the sheet 22 and extended through one of the openings 19. After the sensing elements have thus been set in place, a third laminating sheet 23 of polyvinyl butyral is placed in position over the second laminating sheet 22. This sheet does not have any holes in it.

It is contemplated that the laminating sheets of polyvinyl butyral may be a single sheet or a number of individual sheets which will form a single sehet during laminating as mentioned above, and when multiple layers of thin sheets are used the thickness may be varied by the number of sheets added.

To complete the article, the sheet 13 is placed in contact with the third laminating sheet 23. In general, this sheet may be any transparent sheet material but in the preferred form of this invention it should be a transparent plastic material which may be bent or shaped without injury to the other plastic materials and electrically conducting film 12. Preferably, the sheet 13 is a polymethyl-methacrylate plastic such as "Plex 55" which has been stretched multi-axially in a common plane at an elevated temperature and coated with an adhesive suitable for laminating this plastic material. This adhesive may be applied by spraying or any other methods which provide a thin coating.

By stretching the polymethyl methacrylate at an elevated temperature before it is laminated, a reorientation of the molecular structure takes place which is retained after the sheet has cooled, and it has been found that the resistance of the material to crack propagation is substantially increased thus allowing the sheet to be subjected to bending stresses and other stresses after fabrication without impairing the strength of the completed article.

Now before laminating the respective sheets together, according to another aspect of the invention, it has been found that the openings 19 in the sheets 11 created a problem in laminating because the interface of the sheet 11 has a tendency to flow into the holes 19 causing the sheet to become distorted. To overcome this tendency, plugs are placed in the openings 19 of the sheet to prevent the interface of the sheets from flowing into the openings. These plugs are removed after laminating and may be of any suitable material and are preferably such that they do not become bonded to the article. In addition, a parting material may be applied to the face of the plugs to prevent bonding during the laminating steps.

After the plugs have been placed in proper position, the laminae are aligned and placed in an autoclave to be laminated. For the stretched plastics described above the temperature generally is not permitted to exceed 225° F. However, it will be apparent that with other plastics the laminating temperature may be increased or decreased depending upon the particular characteristics. While an adhesive coating was placed on the Plexiglas to laminate it to the laminating sheet 23, it was found that it is not necessary to place an adhesive material between the electrically conducting film 12, and the first laminating sheet 21. This is because the adhesive layer $d$ and protective layer $e$ of the film 12 act as an adhesive for polyvinyl butyral, polyvinyl acetate and other laminating materials which readily adhere thereto when subjected to laminating conditions.

The completed structure thus produced while having very excellent durability properties, may be shaped after lamination without substantial loss of electrical and physical properties. However, it is evident that the principles of the invention may be used with article of various shapes and contours and is not limited to bent sheets. In this connection the term "support body" when used in the claims is intended to include both flat sheets and article having various shapes and contours.

It is to be understood that the forms of the invention herewith described are to be taken as illustrative embodiments only, and that various procedural changes may be resorted to without departing from the spirit of the invention or the scope of the following claims.

We claim:

1. A transparent electrically conducting unit, comprising a transparent sheet of polyester resinous material having a thermally evaporated electrically conducting film on a surface thereof, said electrically conducting film being a metal selected from the group consisting of gold, silver, copper, iron and nickel deposited by vacuum techniques, a pair of spaced bus bars in electrical contact with said film, an interlayer of polyvinyl butyral resin overlying said electrically conducting film, a sensing element embedded in said interlayer material, and a sheet of polymethyl methacrylate resin which has been prestretched poly-axially in a common plane and adhered to said interlayer.

2. A method of making a transparent electrically conducting unit, comprising providing an electrically conducting film on a transparent synthetic resinous plastic sheet, placing electrodes in electrical contact with said electrically conducting film, placing holes in the plastic material in close proximity to said electrodes, placing lead wires in electrical contact with said electrodes and extending through said holes, assembling a transparent plastic interlayer material in contact with said electrically conducting film, placing a second sheet of transparent plastic material adjacent to said interlayer, putting plugs of plastic material into said holes, and subjecting the assembly to heat and pressure to form a composite unit.

3. A method of making a transparent electrically conducting unit, comprising providing an electrically conducting film on a transparent synthetic resinous sheet, placing electrodes in electrical contact with said electrically conducting film, placing lead wires over the length of said electrodes, placing a sheet of plastic material over the transparent electrically conducting film and said lead wires, applying localized heating to tack the lead wires to the interlayer, placing a second sheet of transparent plastic material adjacent to said interlayer, and subjecting the assembly to heat and pressure to form a composite unit.

4. A method of making a transparent electrically conducting unit, comprising providing an electrically conducting film on a transparent synthetic resinous plastic sheet, assembling a transparent plastic interlayer material in contact with said electrically conducting film, placing a second sheet of transparent plastic material adjacent to said interlayer, said second sheet of transparent plastic material being a polymethyl methacrylate resin which has been multi-axially stretched within a common plane, and subjecting the assembly to heat and pressure to form a composite unit.

5. A transparent electrically conducting unit, comprising a first transparent synthetic resinous plastic sheet having a thermally evaporated electrically conducting film of metal on a surface thereof, a pair of spaced bus bars in electrical contact with said film, a second transparent synthetic resinous plastic sheet overlying said electrically conductive film and a third sheet of synthetic resinous plastic material over said second sheet, all of said plastic sheets being laminated together to form a composite unit, and a pair of lead wires embedded in the second transparent plastic sheet and held in electrical contact with said bus bars.

6. A transparent electrically conductive unit, comprising a first transparent synthetic resinous plastic sheet having a thermally evaporated electrically conductive film of metal on a surface thereof, a pair of spaced bus bars in electrical contact with said film, a second transparent synthetic resinous plastic sheet overlying said electrically conductive film and a sheet of polymethyl methacrylate over said second sheet, all of said plastic sheets being laminated together to form a composite unit, said sheet of polymethyl methacrylate having been pre-stretched and retained in the stretched condition after the sheets have been laminated.

7. A transparent electrically conductive unit, comprising a first transparent synthetic resinous plastic sheet having a thermally evaporated electrically conductive film of gold metal and an adhesive coating disposed thereover, a pair of spaced bus bars in electrical contact with said film, a second transparent synthetic resinous plastic sheet overlying said electrically conductive film and a third sheet of synthetic resinous plastic material over said second sheet, all of said plastic sheets being laminated together to form a composite unit.

8. A transparent electrically conductive unit, comprising a sheet of polyester-type plastic having a thermally evaporated electrically conductive film of metal on a surface thereof, a pair of spaced bus bars in electrical contact with said film, a sheet of polyvinyl butyral overlying said electrically conductive film and a sheet of polymethyl methacrylate over said second sheet, all of said plastic sheets being laminated together to form a composite unit.

9. A transparent electrically conducting unit, comprising a first transparent synthetic resinous plastic sheet having a thermally evaporated electrically conducting film of metal on a surface thereof, a pair of spaced bus bars in electrical contact with said film, a second transparent synthetic resinous plastic sheet overlying said electrically conducting film, said second sheet having sensing elements embedded therein for determining and controlling the temperature of said laminated unit, and a third sheet of synthetic resinous plastic material over said second sheet, all of said plastic sheets being laminated together to form a composite unit.

References Cited in the file of this patent

UNITED STATES PATENTS

| | | |
|---|---|---|
| 2,427,557 | Gregorius | Sept. 16, 1947 |
| 2,507,036 | McCrumm et al. | May 9, 1950 |
| 2,552,955 | Gaiser et al. | May 15, 1951 |
| 2,579,383 | Goudsmit | Dec. 18, 1951 |
| 2,600,485 | Cox | June 17, 1952 |
| 2,601,318 | Navikas | June 24, 1952 |
| 2,613,306 | Waltersdorf et al. | Oct. 7, 1952 |
| 2,628,927 | Colbert et al. | Feb. 17, 1953 |
| 2,704,265 | Lyon | Mar. 15, 1955 |
| 2,739,083 | Brown et al. | Mar. 20, 1956 |
| 2,740,732 | Peck et al. | Apr. 3, 1956 |
| 2,750,832 | Morgan | June 19, 1956 |
| 2,758,948 | Simon | Aug. 14, 1956 |
| 2,761,945 | Colbert et al. | Sept. 4, 1956 |
| 2,783,176 | Boicey | Feb. 26, 1957 |
| 2,799,764 | Chandler | July 16, 1957 |
| 2,804,533 | Nathanson | Aug. 27, 1957 |

OTHER REFERENCES

Kuettel: "Shatter-Resistant Plastic Glazing," Modern Plastics, (August 1944), pp. 85–89 relied upon.

Dalin et al.: "The Development of Electrical Conducting Transparent Coatings for Acrylic Plastic Sheet"; WADC Technical Report 53–378; catalogued by ASTIA as AD No. 27764; January 1954, pp. 1–15 relied upon.